US011988106B2

(12) United States Patent
Neuberger et al.

(10) Patent No.: US 11,988,106 B2
(45) Date of Patent: May 21, 2024

(54) HEAT-PROTECTION ELEMENT FOR A BEARING CHAMBER OF A GAS TURBINE

(71) Applicant: MTU Aero Engines AG, Munich (DE)

(72) Inventors: Florian Neuberger, Dorfen (DE); Kaspar Wolf, Munich (DE)

(73) Assignee: MTU Aero Engines AG, Munich (DE)

( * ) Notice: Subject to any disclaimer, the term of this patent is extended or adjusted under 35 U.S.C. 154(b) by 13 days.

(21) Appl. No.: 17/943,355

(22) Filed: Sep. 13, 2022

(65) Prior Publication Data

US 2023/0184134 A1 Jun. 15, 2023

(30) Foreign Application Priority Data

Sep. 21, 2021 (DE) ........................ 102021124357.2

(51) Int. Cl.

| | |
|---|---|
| ***F01D 25/08*** | (2006.01) |
| ***F01D 5/08*** | (2006.01) |
| ***F01D 25/12*** | (2006.01) |
| ***F01D 25/14*** | (2006.01) |
| ***F01D 25/16*** | (2006.01) |

(52) U.S. Cl.

CPC ............. *F01D 25/08* (2013.01); *F01D 5/087* (2013.01); *F01D 25/125* (2013.01); *F01D 25/14* (2013.01); *F01D 25/145* (2013.01); *F01D 25/16* (2013.01); *F01D 25/162* (2013.01); *F05D 2240/15* (2013.01); *F05D 2260/231* (2013.01)

(58) Field of Classification Search

CPC ........ F01D 25/08; F01D 25/125; F01D 25/14; F01D 25/145; F01D 25/16; F01D 25/162; F01D 25/00; F02C 7/06; F05D 2240/15; F05D 2260/231

See application file for complete search history.

(56) References Cited

U.S. PATENT DOCUMENTS 3,347,553 A * 10/1967 Schweiger .............. F01D 11/04 277/390
3,862,443 A * 1/1975 Edick .................... F16C 37/007 310/90

(Continued)

FOREIGN PATENT DOCUMENTS

EP 3054089 A1 8/2016

*Primary Examiner* — Courtney D Heinle
*Assistant Examiner* — Ryan C Clark
(74) *Attorney, Agent, or Firm* — Davidson, Davidson & Kappel, LLC

(57) ABSTRACT

Described is a heat-protection element (50) for a gas turbine (10), in particular an aircraft gas turbine, the heat-protection element (50) being adapted to at least partially surround a bearing chamber (60) of the gas turbine (10) and having at least one connecting portion (52) which is disposed in an axially forward region (VB) and connectable or connected by a material-to-material bond to a protective element (54) of a seal carrier, in particular a seal carrier with a carbon seal, at least one supporting portion (58) which is disposed in an axially central region (MB) and adapted to support the heat-protection element (50) radially on the bearing chamber (60), an end portion (64) which is disposed in an axially rearward region (HB) and forms a free end (66) of the heat-protection element (50) and which is configured such that the end portion surrounds (64) the bearing chamber (60) in a contactless manner.

16 Claims, 3 Drawing Sheets

(56) References Cited

U.S. PATENT DOCUMENTS

| | | | | | |
|---|---|---|---|---|---|
| 4,542,623 | A * | 9/1985 | Hovan | F01D 25/125 | 415/176 |
| 4,709,545 | A * | 12/1987 | Stevens | F01D 25/125 | 60/39.83 |
| 5,433,584 | A * | 7/1995 | Amin | F16C 27/045 | 415/230 |
| 5,622,438 | A * | 4/1997 | Walsh | F01D 25/162 | 384/624 |
| 5,890,881 | A * | 4/1999 | Adeff | F04D 25/04 | 415/111 |
| 8,834,095 | B2 * | 9/2014 | Davis | F04D 29/059 | 415/171.1 |
| 9,447,817 | B2 * | 9/2016 | Gallimore | F02C 7/06 | |
| 9,605,551 | B2 | 3/2017 | Feldmann et al. | | |
| 9,677,419 | B2 | 6/2017 | Heidingsfelder et al. | | |
| 9,840,938 | B1 * | 12/2017 | Vinski | F16C 35/045 | |
| 10,415,481 | B2 | 9/2019 | Grogg et al. | | |
| 10,982,562 | B2 * | 4/2021 | Stiehler | F02C 7/06 | |
| 11,105,222 | B1 | 8/2021 | Lefebvre et al. | | |
| 2002/0192016 | A1 * | 12/2002 | Monninghoff | F16C 11/0609 | 403/122 |
| 2009/0101087 | A1 * | 4/2009 | Ueno | F01D 25/16 | 123/41.31 |
| 2015/0252689 | A1 * | 9/2015 | Burmester | F02C 7/24 | 415/177 |
| 2016/0032763 | A1 * | 2/2016 | Grogg | F01D 25/162 | 29/428 |
| 2016/0032768 | A1 * | 2/2016 | Schumnig | F01D 25/16 | 415/203 |
| 2016/0032780 | A1 | 2/2016 | Grogg et al. | | |
| 2016/0130975 | A1 * | 5/2016 | Chilton | F01D 25/162 | 415/9 |
| 2016/0238137 | A1 * | 8/2016 | Clark | F16C 37/00 | |
| 2017/0298761 | A1 * | 10/2017 | Williams | F01D 5/02 | |
| 2018/0031002 | A1 | 2/2018 | Yuen et al. | | |
| 2019/0136712 | A1 * | 5/2019 | Chandramohanan | F02C 7/24 | |
| 2019/0249569 | A1 | 8/2019 | Stiehler et al. | | |
| 2021/0054756 | A1 * | 2/2021 | LaPera | F01D 5/10 | |
| 2022/0049623 | A1 * | 2/2022 | Campo | F01D 25/20 | |
| 2022/0252013 | A1 * | 8/2022 | Beinor | F02C 7/06 | |

* cited by examiner

HEAT-PROTECTION ELEMENT FOR A BEARING CHAMBER OF A GAS TURBINE

This claims the benefit of German Patent Application DE 10 2021 124357.2 filed on Sep. 21, 2021 which is hereby incorporated by reference herein.

The present invention relates to a heat-protection element for a gas turbine, in particular an aircraft gas turbine, the heat-protection element being adapted to at least partially surround a bearing chamber of the gas turbine. Furthermore, the invention relates to a heat-protection unit and a gas turbine having a heat-protection element.

Directional words such as "axial," "axially," "radial," "radially," and "circumferential" are taken with respect to the machine axis of the gas turbine, unless explicitly or implicitly indicated otherwise by the context. Furthermore, terms such as "axially forward" and "axially rearward" are taken with respect to the normal main direction of gas flow in the gas turbine, unless explicitly indicated otherwise by the context.

BACKGROUND

Bearing chambers in axially rearward portions or regions of a gas turbine, in particular an aircraft gas turbine, must be insulated from hot cavities in the gas turbine to prevent an allowable temperature of circulating coolants, such as oil or the like, from being exceeded. To this end, it is known to blow cooling air or sealing air into the cavity and/or to insulate the cavities by means of heat-protection elements.

In a customary design, a bearing chamber is circumferentially surrounded by a radially outer heat shield and a radially inner heat shield. The radially inner heat shield is of two-part construction, including a forward heat shield and a rearward heat shield, both the forward heat shield and the rearward heat shield being connected to the bearing chamber by a material-to-material bond, in particular by welding or brazing. Because of the material-to-material bond, the inner heat shield is not removable from the bearing chamber. This leads to the problem that the bearing chamber cannot be inspected, or can be inspected only with difficulty. Furthermore, it has been found that fretting can occur, in particular at the points of connection of the rear heat shield with the highly stressed bearing chamber.

With regard to the technological background, reference is made, by way of example, to the following publications: US 20190249569A1, U.S. Pat. Nos. 9,605,551B2 and 10,415,481B2. These publications merely generally describe protective heat shields for gas turbines, but do not disclose any protective heat shields that are disposed specifically about a bearing chamber.

SUMMARY OF THE INVENTION

It is an object of the invention to provide a heat-shield element for a gas turbine that will overcome the above disadvantages.

The present invention provides a heat-protection element for a gas turbine, in particular an aircraft gas turbine, the heat-protection element being adapted to at least partially surround a bearing chamber of the gas turbine and having at least one connecting portion which is disposed in an axially forward region and connectable or connected by a material-to-material bond to a protective element of a seal carrier, in particular a seal carrier with a carbon seal, at least one supporting portion which is disposed in an axially central region and adapted to support the heat-protection element radially on the bearing chamber, and an end portion which is disposed in an axially rearward region and forms a free end of the heat-protection element and which is configured such that the end portion surrounds the bearing chamber in a contactless manner.

Such a design of the heat-protection element makes it possible to prevent fretting-inducing contact between the heat-protection element and the bearing chamber in the axially rearward region. A distance of a few millimeters is formed between the end portion and the bearing chamber. Thus, despite the contactless arrangement, such a heat-protection element enables good thermal shielding of the bearing chamber in the axially rearward region of the heat-protection element.

The heat-protection element may be formed as a single piece. In other words, in a departure from previous heat-protection elements, a radially inwardly disposed, single-piece or single-part heat-protection element is provided, so that there is no longer a plurality of parts, and, in particular, material-to-material bonding of an axially rearward heat-protection element can also be dispensed with.

The heat-protection element may be configured such that, together with the protective element of the seal carrier, it forms a heat-protection unit that is attachable or attached to an axially forward flange portion of the bearing chamber. In particular, the heat-protection unit may be connected to the flange portion of the bearing chamber by means of threaded connecting means in the axial direction.

The heat-protection element and the heat-protection unit may respectively be slidable onto the bearing chamber or removable therefrom from an axially forward end. Thus, during an inspection of the gas turbine, the heat-protection element and the heat-protection unit surrounding the bearing chamber can respectively be separated from the bearing chamber, so that the bearing chamber can be inspected. This also allows, in particular, for simplified replacement of a heat-protection element and a heat-protection unit, respectively.

In the heat-protection element, at least three circumferentially distributed, tab-like connecting portions may be formed in the axially forward region. These tab-like connecting portions can enable a kind of point-by-point-type, material-to-material connection between the heat-protection element and the protective element of the seal carrier.

Alternatively, a single circumferential connecting portion, in particular in the form of a circumferential welded or brazed seam, may be formed in the axially forward region of the heat-protection element. Furthermore, it is also conceivable that a connection may be made by press joining between the heat-protection element and the protective element of the seal carrier.

The end portion of the heat-protection element may be bent over axially forwardly, in particular in a brim-like manner. By shaping the end portion in this way, it is possible to achieve sufficient stability and stiffness for the end portion, thereby making it possible to ensure its contactless arrangement with respect to the bearing chamber, in particular also during operation of the gas turbine and under corresponding thermal and mechanical loading.

In the axially central region of the heat-protection element, at least three circumferentially distributed, radially inwardly formed corrugations may be formed which serve as respective supporting portions. It is, of course, also possible that more than three corrugations may be provided. Furthermore, it is also conceivable that one corrugation may be formed continuously in the circumferential direction.

Alternatively, in the axially central region of the heat-protection element, a single circumferential supporting portion may be provided which can be brought into contact with, or is in contact with, an annular sealing device, in particular a rope seal, supported on the bearing chamber. Such an annular sealing device may be received, for example, in a groove-like recess provided in the outer periphery of the bearing chamber. In such an embodiment, the supporting portion on the heat-protection element may also be configured without a special shape, in particular straight in the axial direction.

There is further provided a heat-protection unit for a bearing chamber of a gas turbine, in particular an aircraft gas turbine, the heat-protection unit being made up of a heat-protection element as described above and an additional protective element of a seal carrier, which protective element is connected by a material-to-material bond to the heat-protection element in an axially forward region of the heat-protection unit. Optional embodiments of the heat-protection element as described above may also be implemented or used for the heat-protection unit.

The additional protective element of the seal carrier may in particular be a substantially annularly shaped sleeve that surrounds and thermally shields a seal carrier for a carbon seal. The carbon seal serves in particular to provide sealing with respect to a shaft of the gas turbine.

Also provided is a gas turbine, in particular an aircraft gas turbine, having at least one bearing chamber around which is disposed a heat-protection element as described above or a heat-protection unit as described above. The heat-protection element may be provided in the region of a turbine center frame or as part of a turbine center frame.

BRIEF DESCRIPTION OF THE DRAWINGS

The invention will now be described by way of example, and not by way of limitation, with reference to the accompanying drawings.

DETAILED DESCRIPTION

Figure 1:
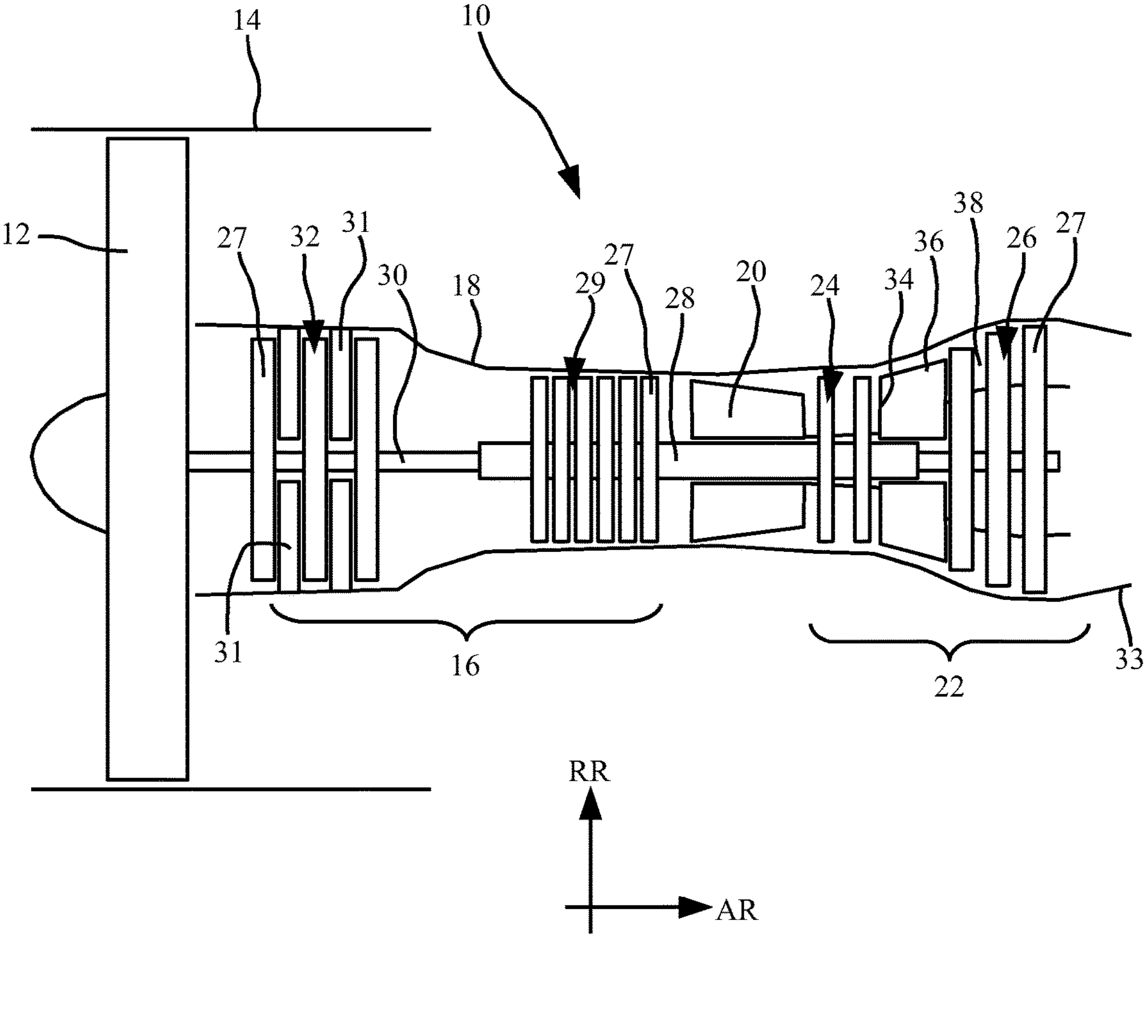
FIG. 1 is a simplified, schematic representation of an aircraft gas turbine.

FIG. 1 shows, in simplified schematic form, an aircraft gas turbine 10, illustrated, merely by way of example, as a turbofan engine. Gas turbine 10 includes a fan 12 surrounded by a schematically indicated casing 14. Disposed downstream of fan 12 in the axial direction AR of gas turbine 10 is a compressor 16 that is accommodated in a schematically indicated inner casing 18 and may be single-stage or multi-stage. Disposed downstream of compressor 16 is combustor 20. The flow of hot exhaust gas exiting the combustor then flows through the downstream turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a low-pressure compressor 32 so that they are jointly driven or rotated. Disposed downstream of turbine 22 is an exhaust nozzle 33, which is only schematically indicated here.

In the illustrated example of an aircraft gas turbine 10, a turbine center frame 34 is disposed between high-pressure turbine 24 and low-pressure turbine 26 and extends around shafts 28, 30. Hot exhaust gases from high-pressure turbine 24 flow through turbine center frame 34 in its radially outer region 36. The hot exhaust gas then flows into an annular space 38 of low-pressure turbine 26. Compressors 29, 32 and turbines 24, 26 are illustratively represented by rotor blade rings 27. For the sake of clarity, the usually present stator vane rings 31 are shown, by way of example, only for compressor 32.

Figure 2:
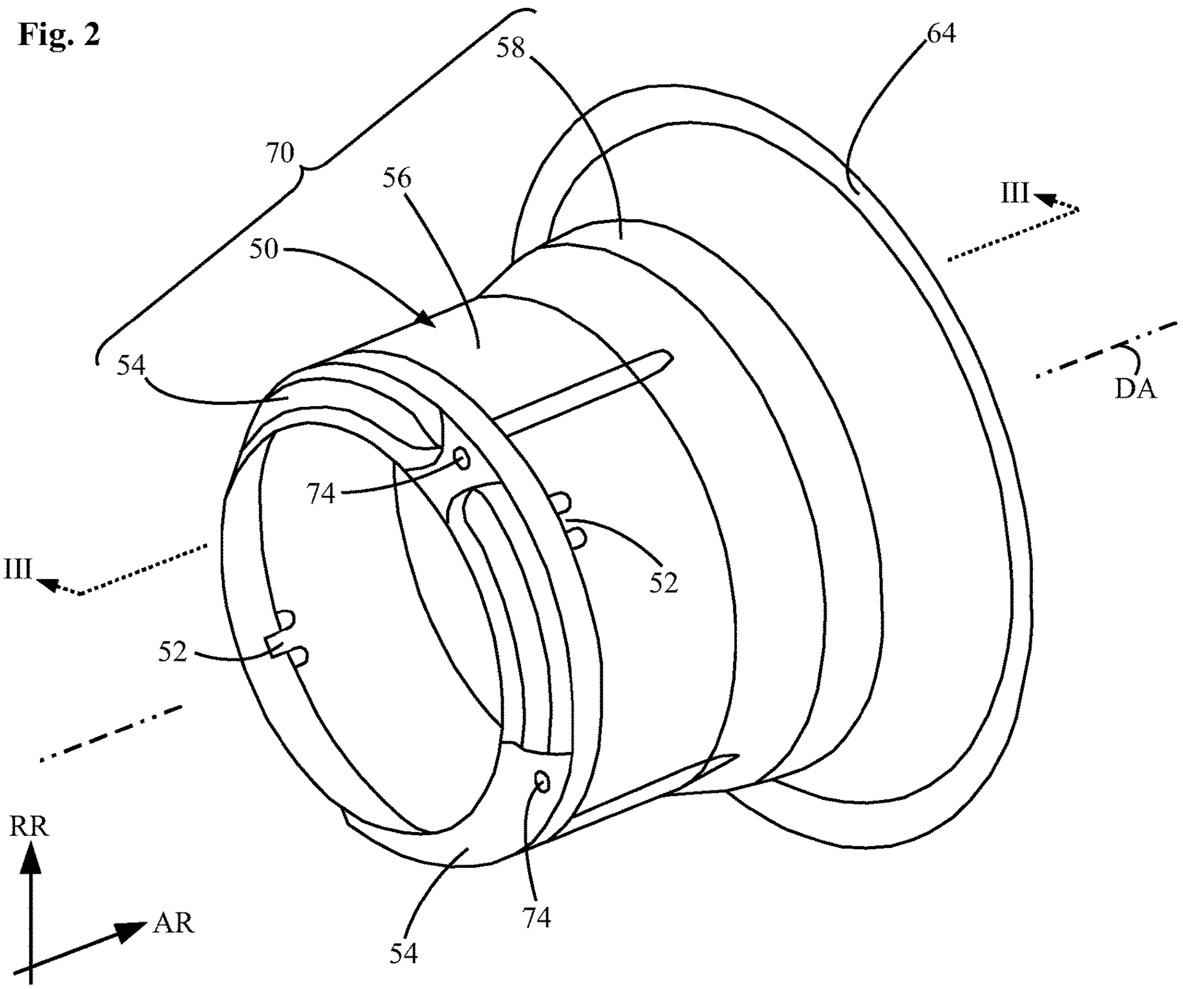
FIG. 2 is a simplified schematic perspective view of a heat-protection element and a heat-protection unit.

FIG. 2 shows, in a simplified schematic perspective view, a heat-protection element 50, which may be used in a gas turbine 10. In FIG. 2, there is indicated an axis of rotation DA, which coincides with the axes of the shafts 28, 30 (FIG. 1) of the gas turbine. Heat-protection element 50 is disposed in the region of a bearing chamber in which at least one shaft 28, 30 of the gas turbine is supported. Referring to FIG. 1, heat-protection element 50 may in particular be disposed in the region of turbine center frame 34, in particular radially inwardly of the radially outer region 36 shown in FIG. 1, in which hot gas flows.

Heat-protection element 50 has at least one connecting portion 52 in an axially forward region VB. The connecting portion(s) 52 is/are connected by a material-to-material bond to a protective element 54. Protective element 54 surrounds or covers a seal carrier (not specifically shown here). Heat-protection element 50 has a main body 56 which, beginning at the joint with protective element 54, extends axially rearwardly and has different radii along the axial length. In particular, the radius of heat-protection element 50 regionally increases discretely or continuously from an axially forward end toward an axially rearward end along portions of its length.

Figure 3:
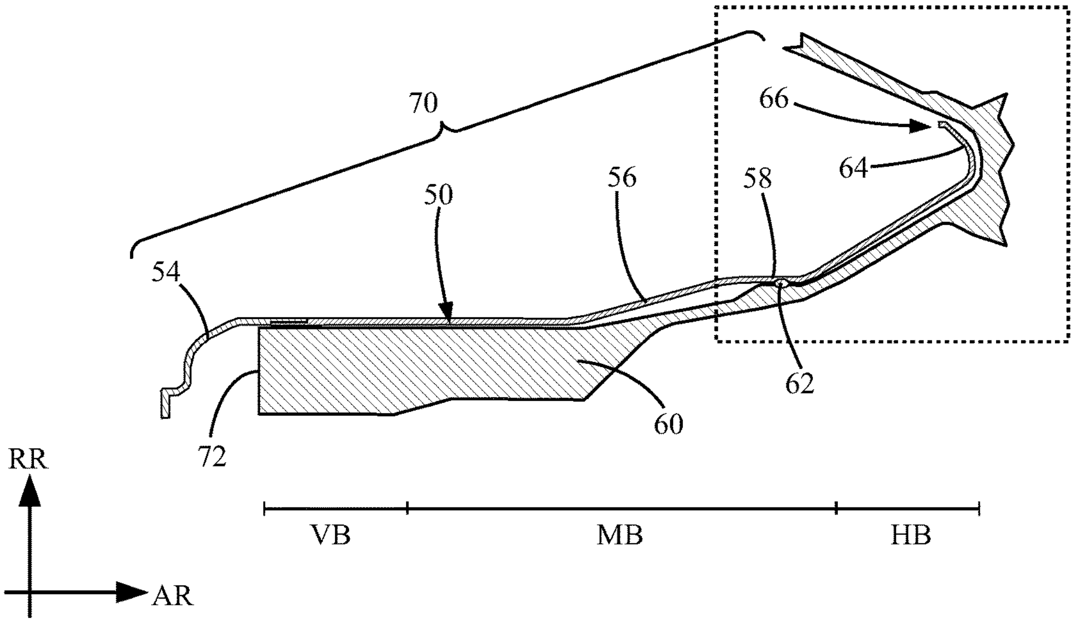
FIG. 3 is a simplified schematic sectional view of a bearing chamber and a heat-protection element, corresponding substantially to the line III-III of FIG. 2.
Figure 4:
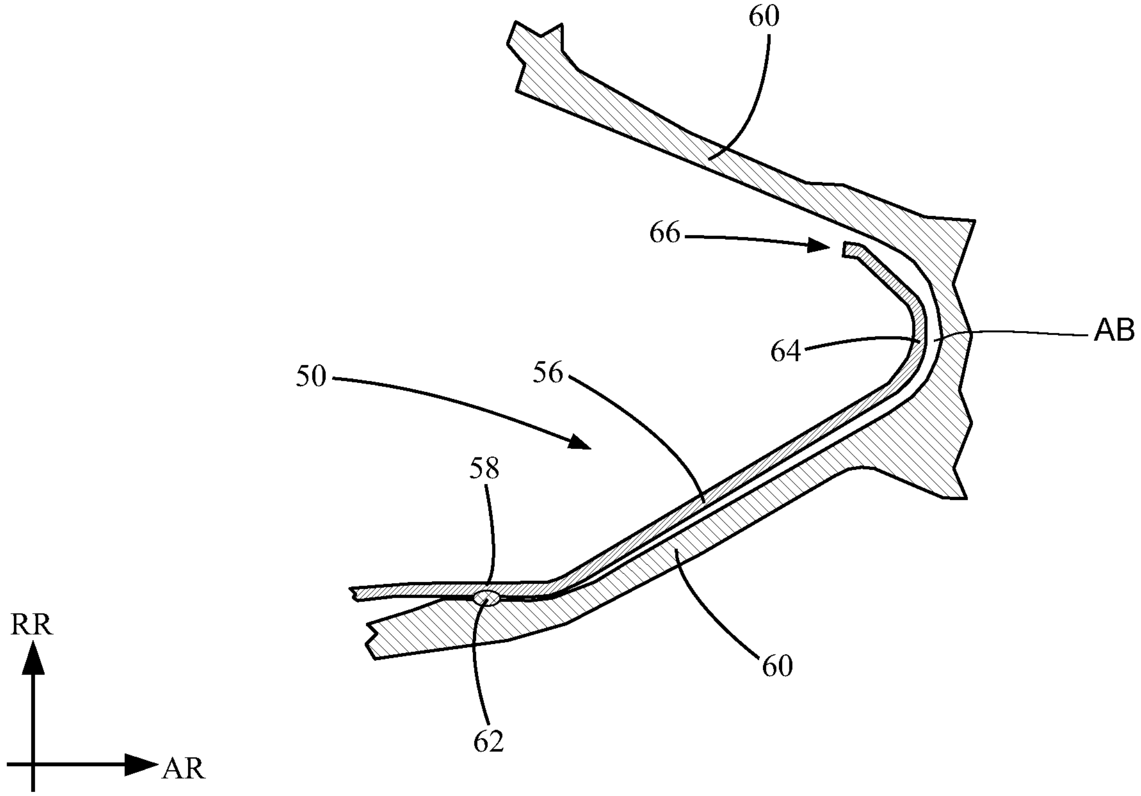
FIG. 4 is a simplified schematic enlarged sectional view of an axially central portion and a rearward portion of the heat-shield element and of the bearing chamber, corresponding substantially to the region indicated by rectangle IV in FIG. 3.

In the further description of heat-protection element 50, reference is also made simultaneously to the sectional views of FIGS. 3 and 4.

In an axially central region MB, a supporting portion 58 is provided which is adapted to support heat-protection element 50 radially on a bearing chamber 60, which is shown in simplified form in the sectional views. The support of heat-protection element 50 may be accomplished via a supporting element 62, which in FIGS. 3 and 4 is shown merely schematically to represent different types of support.

In an axially rearward region HB, heat-protection element 50 has an end portion 64, which forms a free end of heat-protection element 50. End portion 64 is formed or bent over in such a way that end portion 64 surrounds bearing chamber 60 in a contactless manner. In other words, a distance AB or clearance is formed between end portion 64 and bearing chamber 60.

The heat-protection element 50 shown in FIGS. 2 through 4 may be formed as a single piece. The above-described connecting portions 52, supporting portion 58, and end portion 64 may be made from a single workpiece or material.

Heat-protection element 50 and the protective element 54 of the seal carrier together form a heat-protection unit 70.

Heat-protection unit 70 may be attachable or attached to an axially forward flange portion 72 (merely schematically indicated in FIG. 3) of bearing chamber 60. Heat-protection unit 70 may, for example, be slidable onto bearing chamber 60 or removable therefrom from an axially forward end.

For example, at least three circumferentially distributed, tab-like connecting portions 52 may be formed in axially forward region VB. Such a design can be seen, for example, in FIG. 2, where only two of several connecting portions 52 are shown.

Alternatively, heat-protection element 50 may have a single circumferential connecting portion 52, in particular in the form of a circumferential welded or brazed seam, in axially forward region VB.

As can be seen from FIGS. 2 through 4, end portion 64 of heat-protection element 50 is bent over axially forwardly. End portion 64 may also be described as being bent over in a brim-like manner. By shaping end portion 64 in this way, it is possible to achieve sufficient stability and stiffness for end portion 64, thereby making it possible to ensure its contactless arrangement (with a distance or clearance AB) with respect to bearing chamber 60, in particular also during operation of gas turbine 10 and under corresponding thermal and mechanical loading.

In accordance with embodiments, the above-mentioned schematically and representatively shown supporting element 62 may be configured such that at least three circumferentially distributed, radially inwardly formed corrugations are formed on heat-protection element 50 in axially central region MB, the corrugations serving as respective supporting portions 58 or supporting element 62.

Alternatively, in axially central region MB, a single circumferential supporting portion 58 may be provided which can be brought into contact with, or is in contact with, an annular sealing device supported on bearing chamber 60. In other words, the illustrated supporting element 62 may also be understood as being or representing such an annular sealing device.

Heat-protection unit 70 may, for example, be connected to bearing chamber 60 by threaded connecting means, as illustrated in FIG. 2 by holes 74.

With regard to axial regions VB, MB, HB, it should be noted that these regions may be determined or defined based on a percentage of the axial length of heat-protection element 50. Referring to FIG. 3, forward and rearward regions VB, HB are illustrated as being about 20% of the axial extent of heat-protection element 50, with central region MB being about 60%. This percentage distribution is purely exemplary. In particular, the forward or rearward region VB may also be defined to be shorter or longer, for example, in a range of about 5% to 30% of the axial extent of heat-protection element 50. As a consequence, central region MB may be about 40% to 90% of the axial extent.

A design of heat-protection element 50 as presented above makes it possible to prevent fretting-inducing contact between heat-protection element 50 and bearing chamber 60 in axially rearward region HB. In such design, the distance AB or clearance is formed between end portion 64 and bearing chamber 60. This distance AB may be a few millimeters. Despite the contactless arrangement, the heat-protection element 50 presented here enables good thermal shielding of bearing chamber 60 in axially rearward region HB of heat-protection element 50. In a departure from previous heat-protection elements, and due to the single-piece design of heat-protection element 50, a radially inwardly disposed, single-piece or single-part heat-protection element 50 is provided, so that there is no longer a plurality of parts, and, in particular, material-to-material bonding of an axially rearward heat-protection element can also be dispensed with.

LIST OF REFERENCE NUMERALS

10 aircraft gas turbine
12 fan
14 casing
16 compressor
18 inner casing
20 combustor
22 turbine
24 high-pressure turbine
26 low-pressure turbine
28 hollow shaft
29 high-pressure compressor
30 shaft
31 stator vane ring
32 low-pressure compressor
33 exhaust nozzle
34 turbine center frame
36 radially outer region
38 annular space
50 heat-protection element
52 connecting portion
54 protective element
56 main body
58 supporting portion
60 bearing chamber
62 supporting element
64 end portion
66 free end
70 heat-protection unit
72 flange portion
74 hole
AB distance or clearance
AR axial direction
RR radial direction
HB axially rearward region
MB axially central region
VB axially forward region

What is claimed is:

1. A gas turbine comprising:

at least one bearing chamber; and a heat-protection element for a gas turbine, the heat-protection element adapted to at least partially surround the bearing chamber and including:

at least one connecting portion disposed in an axially forward region and connectable or connected by a material-to-material bond to a protective element of a seal carrier, at least one supporting portion disposed in an axially central region and adapted to support the heat-protection element radially on the bearing chamber;

an end portion disposed in an axially rearward region and forming a free end of the heat-protection element and configured such that the end portion surrounds the bearing chamber in a contactless manner;

wherein the gas turbine is an airline gas turbine.

2. The gas turbine as recited in claim 1 wherein the heat-protection element is formed as a single piece.

3. The gas turbine as recited in claim 1 wherein the heat-protection element is configured such that, together with the protective element of the seal carrier, the heat-protection element forms a heat-protection unit attachable or attached to an axially forward flange portion of the bearing chamber.

4. The gas turbine as recited in claim 3 wherein the heat-protection unit is slidable onto the bearing chamber or removable therefrom from an axially forward end.

5. The gas turbine as recited in claim 1 wherein at least three circumferentially distributed, tab connecting portions are formed in the axially forward region.

6. The gas turbine as recited in claim 1 wherein a single circumferential connecting portion is formed in the axially forward region.

7. The gas turbine as recited in claim 6 wherein the connecting portion is in the form of a circumferential welded or brazed seam.

8. The gas turbine as recited in claim 1 wherein the end portion is bent over axially forwardly.

9. The gas turbine as recited in claim 1 wherein the end portion defines a brim.

10. The gas turbine as recited in claim 1 wherein in the axially central region, at least three circumferentially distributed, radially inwardly formed corrugations are formed and serve as respective supporting portions.

11. The gas turbine as recited in claim 1 wherein, in the axially central region, there is provided a single circumferential supporting portion contactable with, or is in contact with, an annular sealing device supported on the bearing chamber.

12. The gas turbine as recited in claim 1 wherein the annular sealing device is a rope seal.

13. The gas turbine as recited in claim 1 wherein the heat-protection element is provided in the region of a turbine center frame or as part of a turbine center frame.

14. A gas turbine comprising: a bearing chamber and a heat-protection unit for the bearing chamber, the heat-protection unit comprising a heat-protection element adapted to at least partially surround the bearing chamber and including:

at least one connecting portion disposed in an axially forward region and connectable or connected by a material-to-material bond to a protective element of a seal carrier, at least one supporting portion disposed in an axially central region and adapted to support the heat-protection element radially on the bearing chamber;

an end portion disposed in an axially rearward region and forming a free end of the heat-protection element and configured such that the end portion surrounds the bearing chamber in a contactless manner;

and the protective element, the protective element being connected by the material-to-material bond to the heat-protection element in the axially forward region; wherein the gas turbine is an airline gas turbine.

15. The gas turbine as recited in claim 14 wherein the seal carrier includes a carbon seal.

16. A heat-protection element for a gas turbine, the heat-protection element adapted to at least partially surround the bearing chamber and including:

at least one connecting portion disposed in an axially forward region and connectable or connected by a material-to-material bond to a protective element of a seal carrier, at least one supporting portion disposed in an axially central region and adapted to support the heat-protection element radially on the bearing chamber;

an end portion disposed in an axially rearward region and forming a free end of the heat-protection element and configured such that the end portion surrounds the bearing chamber in a contactless manner;

wherein the heat-protection element is configured such that, together with the protective element of the seal carrier, the heat-protection element forms a heat-protection unit attachable or attached to an axially forward flange portion of the bearing chamber and wherein the heat-protection unit is slidable onto the bearing chamber or removable therefrom from an axially forward end.

* * * * *